Oct. 8, 1957
A. E. BRICKMAN
2,808,792
BAND SEEDING ATTACHMENT FOR GRAIN DRILLS
Filed Aug. 25, 1954
2 Sheets-Sheet 1
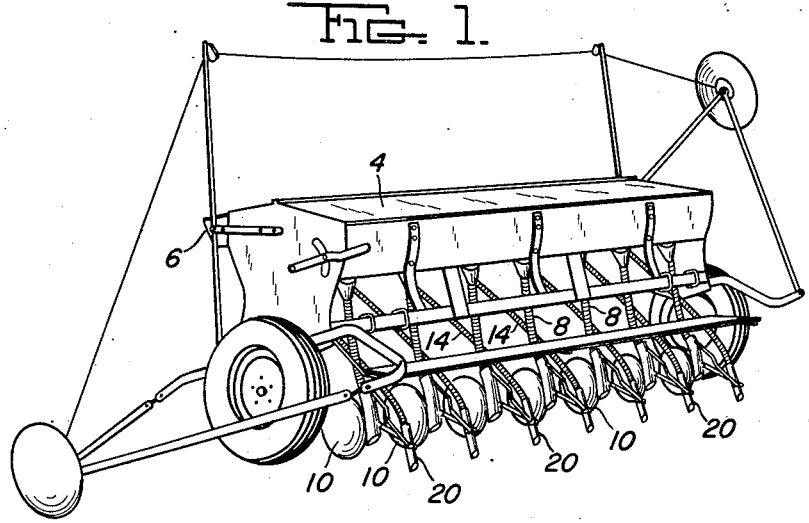
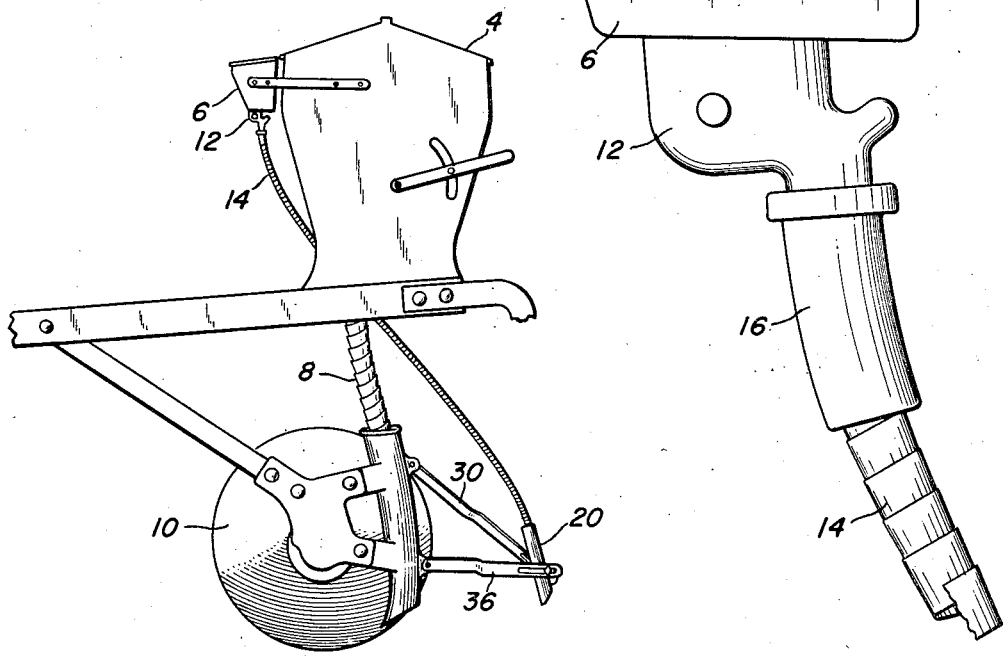
INVENTOR:
ALAN E. BRICKMAN,
BY: Donald G. Dalton
his Attorney.

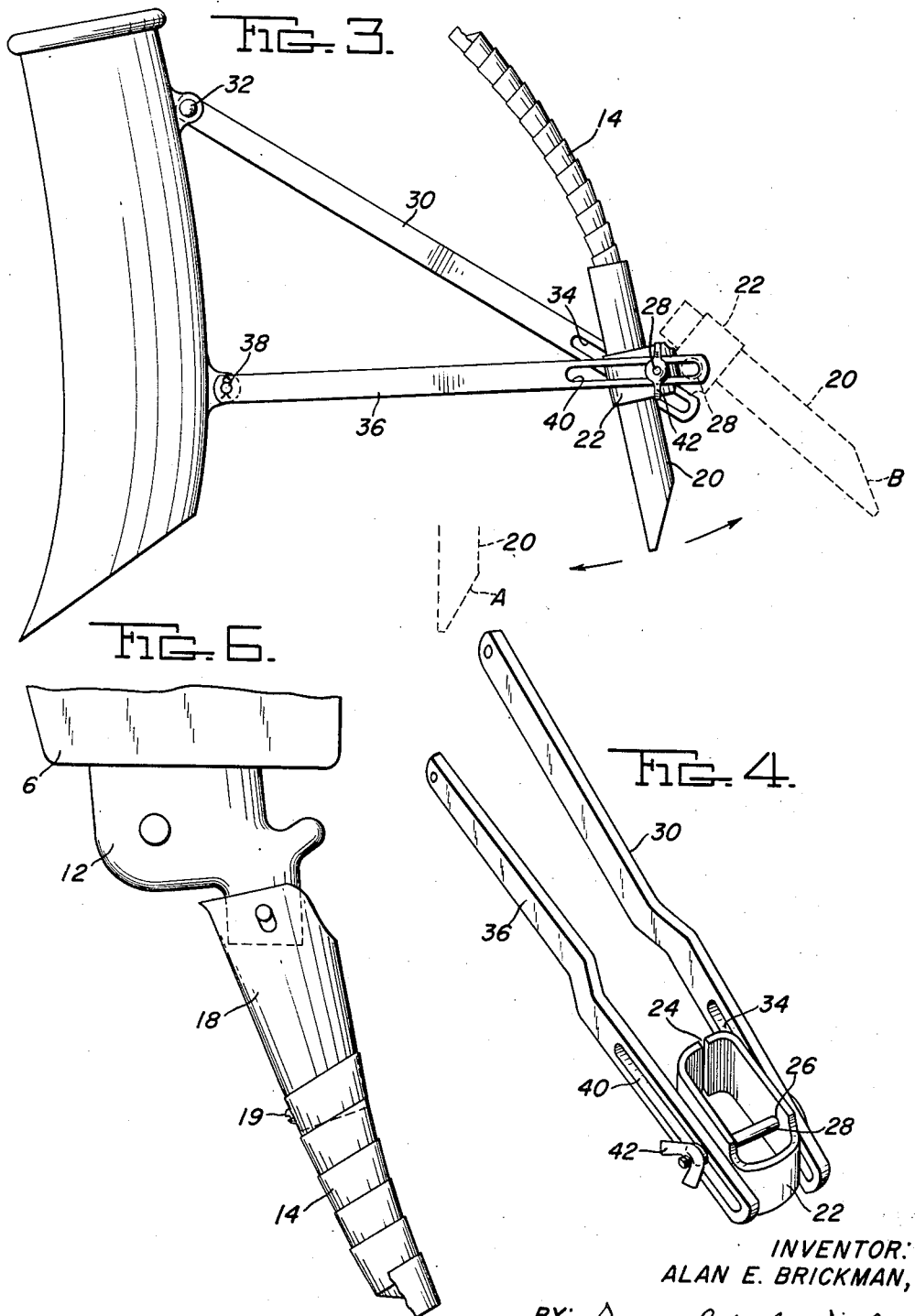

United States Patent Office 2,808,792
Patented Oct. 8, 1957

2,808,792

BAND SEEDING ATTACHMENT FOR GRAIN DRILLS

Alan E. Brickman, Williamsville, N. Y., assignor to United States Steel Corporation, a corporation of New Jersey Application August 25, 1954, Serial No. 452,127

2 Claims. (Cl. 111—80)

This invention relates to a band seeding attachment for grain drills and more particularly to such an attachment that can be used for different makes of grain drills. In band seeding, the discs of the grain drill turn up the soil and a layer of fertilizer is laid in the bottom of the furrow. As the disc moves forward the turned up soil starts to fall back in place. After all or part of the soil is in place the seed is dropped on top of the fertilizer either on top of the surface of the ground or below the surface with some soil between the seed and the fertilizer. At present separate tube attachments are designed for each type of grain drill and the discharge end of the tube is not readily adjustable either in vertical or horizontal directions. The speed at which the tractor drawing the grain drill travels changes the distance between the disc and the completed return of the refill. I have found that in order to feed the seed properly the discharge end of the tube should be adjustable for various distances from the disc depending upon the speed at which the grain drill is traveling. It is also desirable to adjust this distance and the distance of the discharge end of the tube above the ground so that the seed can be discharged either above or below the surface of the ground.

It is therefore an object of my invention to provide a band seeding attachment for grain drills which is suitable for attachment to various types of grain drills.

Another object is to provide such an attachment in which means are provided for readily changing the position of the discharge end of the tube with respect to the disc of the grain drill and also with respect to the ground level.

These and other objects will be more apparent after referring to the following specification and attached drawings, in which:

Figure 1 is a perspective view of one type of grain drill with my band seeding attachment in place;

Figure 2 is a side view of the grain drill and band seeding attachment;

Figure 3 is an enlarged side view of the lower end of the band seeding attachment;

Figure 4 is an enlarged perspective view of the bracket of the band seeding attachment;

Figure 5 is an enlarged view showing one manner of connecting the top of the tube of the band seeder attachment to the seed box of the grain drill; and Figure 6 is a view similar to Figure 5, showing a different means for attaching the top of the seed tube to the seed box.

Referring more particularly to the drawings, reference numerals 4 and 6 indicate hoppers mounted on a grain drill. Hooper 4 receives fertilizer which is delivered by means of a flexible tube 8 to a point immediately behind each disc 10. The hopper 6 contains seed and has a plurality of nozzles 12 at its bottom, one for each of the discs 10. A flexible seed tube 14 is connected to each nozzle 12. The tube 14 is preferably made of spirally wound metal as best shown in Figures 3, 5 and 6. The tube 14 may be attached to the nozzle 12 by means of a rubber coupling 16 as shown in Figure 5 or by untwisting the tube slightly to open it and inserting a feed box nozzle connector 18 therein as shown in Figure 6. In the latter case a screw 19 is preferably used to hold the top convolution of the tube 14 from slipping off the connector 18. A rigid tube 20 surrounds the flexible tube 14 adjacent the bottom thereof and a substantially oval shaped clamping member 22 surrounds the tube 20. Clamping member 22 is made of sheet metal with its ends spaced apart so as to provide an opening 24 on one end thereof. The sides of the member 22 are provided with aligned holes 26 for receiving a bolt 28. A first link 30 has one end pivotally mounted on the grain drill by means of a hinge pin 32. The free end of the link 30 lies along one side of the clamping member 22 and is provided with a slot 34 for receiving the bolt 28. A second link 36 also has one end pivotally connected to the grain drill by means of a hinge pin 38. This connection may be made at the hole which is common to all drills for the attachment of the drag chain which is used to cover the seed when using the broad-cast method of seeding, but which is not used in band seeding. The free end of the hinge 36 is provided with a slot 40 and lies against the side of the clamping member 22 opposite the link 30. A wing nut 42 attached to the bolt 28 holds the parts together. It will be seen that the upper part of the tube 14 can be readily connected to the nozzle 12 and that the lower end of the tube 14 can be held in adjusted position by tightening the nut 42 which tightens the clamping member 22 around the tube 20 and prevents the links 30 and 36 from moving from their adjusted position. When it is desired to change the position of the discharge end of the tube 14 it is only necessary to loosen the wing nut 42 and slide the bolt 28 along the slots 34 and 40 in the desired direction. At the same time the tube 20 can be moved axially in the clamping member 22 if necessary. The nut 42 is then tightened to hold the parts in position.

The clamping member 22 can also be turned through 180° so that the bolt 28 is on the side toward pivot pin 38 as shown in broken lines in Figure 3. This enables the discharge end of tube 20 to be moved to a position a greater distance behind the disc 10. It will be seen that the arrangement described enables the discharge end of tube 20 to be positioned as close to the disc 10 as position A or as distant as position B. In addition the tube 20 may be slid along tube 14 so as to position the end of tube 20 at various distances from the ground.

While several embodiments of my invention have been shown and described it will be apparent that other adaptations and modifications may be made without departing from the scope of the following claims.

I claim:

1. A band seeding attachment for grain drills having a seed box and a nozzle attached thereto comprising a flexible tube adapted to convey seed from the seed box to a point adjacent the ground, means connecting the top part of said tube to the nozzle of said seed box, a rigid tube surrounding the flexible tube adjacent the bottom thereof, a first link having one end pivotally mounted on said grain drill, a second link having one end pivotally mounted on said grain drill at a point below the pivot connection of said first link, a clamping member surrounding said rigid tube, said rigid tube being axially movable in said clamping member, means adjustably connecting said first link to said clamping member so as to vary the distance between its pivot point and the clamping member, and means adjustably connecting said second link to said clamping member so as to vary the distance between its pivot point and the clamping member.

2. A band seeding attachment for grain drills having a seed box and a nozzle attached thereto comprising a flexible tube adapted to convey seed from the seed box to a point adjacent the ground, means connecting the top part of said tube to the nozzle of said seed box, a rigid tube surrounding the flexible tube adjacent the bottom thereof, a first link having one end pivotally mounted on said grain drill, a second link having one end pivotally mounted on said grain drill at a point below the pivot connection of said first link, a substantially oval shaped clamping member surrounding said rigid tube, said rigid tube being axially movable in said clamping member, one end of said clamping member being open, said clamping member having aligned openings through its sides, said links having slots therein adjacent their free ends, one of said links having its free end adjacent one side of said clamp and the other of said links having its free end adjacent the other side of said clamp, a bolt passing through said holes and said slots, and a nut adapted to be threaded on said bolt to tighten the clamping member and hold the links and rigid tube in adjusted position.

References Cited in the file of this patent

UNITED STATES PATENTS

| | | |
|---|---|---|
| 522,329 | Packham | July 3, 1894 |
| 844,143 | Kingsley | Feb. 12, 1907 |
| 1,006,771 | Metzler | Oct. 24, 1911 |

FOREIGN PATENTS

| | | |
|---|---|---|
| 1,973 | Australia | July 28, 1911 |